United States Patent [19]

Uchiyama

[11] Patent Number: 4,733,574
[45] Date of Patent: Mar. 29, 1988

[54] POWER TRANSMISSION SYSTEM FOR A FOUR-WHEEL DRIVE MOTOR VEHICLE

[75] Inventor: Shintaro Uchiyama, Tokorozawa, Japan

[73] Assignee: Fuji Jukogyo Kabushiki Kaisha, Tokyo, Japan

[21] Appl. No.: 909,835

[22] Filed: Sep. 19, 1986

[30] Foreign Application Priority Data

Sep. 26, 1985 [JP] Japan ................................ 60-213327

[51] Int. Cl.4 ...................... B60K 20/00; B60K 20/02; B60K 20/04; B60K 20/06

[52] U.S. Cl. .................................... 74/473 R; 74/745; 180/247

[58] Field of Search ............. 74/745, 473 R; 180/247, 180/248

[56] References Cited

U.S. PATENT DOCUMENTS

| | | | |
|---|---|---|---|
| 2,445,716 | 7/1948 | Sternberg | 74/745 |
| 2,637,221 | 5/1953 | Backus et al. | 74/745 |
| 2,654,268 | 10/1953 | Perkins | 74/745 |
| 4,216,680 | 8/1980 | Hayashi et al. | 74/473 R |
| 4,271,722 | 6/1981 | Campbell | 180/247 X |
| 4,356,879 | 11/1982 | Uchiyama | 180/247 |
| 4,452,331 | 6/1984 | Lunn et al. | 180/247 |
| 4,455,883 | 6/1984 | Radcliffe | 74/473 R X |
| 4,506,773 | 3/1985 | Schott | 180/247 X |
| 4,552,036 | 11/1985 | Talano et al. | 180/247 X |
| 4,561,325 | 12/1985 | Jester | 74/473 R |
| 4,621,536 | 11/1986 | Takeuchi | 74/745 X |

Primary Examiner—Dirk Wright
Attorney, Agent, or Firm—Martin A. Farber

[57] ABSTRACT

A transmission system has a main transmission, a sub-transmission, and a transfer clutch for four-wheel drive. The sub-transmission has a reduction gear train for providing a low speed range. A gearshift lever of the main transmission has an ultra-low speed position in a shift pattern. When the gearshift lever is shifted to the ultra-low speed position, a first speed gear of the main transmission and the low speed range of the sub-transmission are selected in response to the operation of the gearshift lever. Further the transfer clutch is engaged, so that ultra-low speed by the four-wheel drive is provided.

10 Claims, 6 Drawing Figures

4,733,574

POWER TRANSMISSION SYSTEM FOR A FOUR-WHEEL DRIVE MOTOR VEHICLE

BACKGROUND OF THE INVENTION

The present invention relates to an apparatus for selecting a power transmission system of a motor vehicle changeable to and from four-wheel drive having a sub-transmission for providing a high speed range and a low speed range.

U.S. Pat. No. 4,356,879 discloses a transmission provided with a transfer clutch for changing the power transmission system from two-wheel drive to four-wheel drive, with a clutch for selecting the sub-transmission, and with a selecting device for operating both clutches for selecting the two-wheel drive, high speed range four-wheel drive, or low speed range four-wheel drive.

When a first-speed gear is selected under the low speed range four-wheel drive, an ultra-low speed gear is provided. The ultra-low speed gear is useful for driving the vehicle on steep uphills, muddy roads and others surface. However, in order to select the ultra-low speed gear, two levers must be operated. Namely, a gearshift lever is operated to select the first-speed gear, and a select lever is operated to select the low speed range four-wheel drive. Such an operation is troublesome to the driver.

SUMMARY OF THE INVENTION

The object of the present invention is to provide an apparatus which is simple in operation for selecting an ultra-low speed gear.

According to the present invention, there is provided a power transmission system for a four-wheel drive motor vehicle, having a main transmission and a sub-transmission operatively connected to an input shaft of the main transmission, the main transmission having a gearshift lever, a shifter arm operatively connected to the gear shift lever, and shifter rail arms selectively engageable with the shifter arm for selecting one of speed gears of the main transmission, the sub-transmission including reduction gear trains and a clutch operable to select the transmitting speeds for transmitting the output of an engine to the input shaft, and a transfer device for transmitting the output of the transmission to auxiliary drive wheels of the vehicle.

The system comprises an ultra-low speed position provided in a shift pattern of the gearshift lever, for selecting a low speed gear by combining a first speed of the main transmission and a low speed range of the sub-transmission, and first means including an engaging portion projected from a shifter rail arm of the first speed of the main transmission, the engaging portion being disposed to engaged with the shifter arm so as to select the first speed when the gearshift lever is moved to the ultra-low speed position.

The system further comprises second means responsive to movement of the gearshift lever for operating the clutch to provide the low speed range of the sub-transmission, and third means responsive to the movement of the gearshift lever for operating the transfer clutch to engage it, whereby an ultra-low speed by four-wheel drive system is established. The second means includes an arm operatively connected to the gearshift lever and an engaging portion operatively connected to the sub-transmission, for providing the low speed range, and the third means includes a switch operated by the movement of the gearshift lever, a vacuum operated actuator for engaging the transfer clutch, and means responsive to the operation of the switch for operating the vacuum operated actuator.

The other objects and features of this invention will become apparently understood from the following description with reference to the accompanying drawings.

BRIEF DESCRIPTION OF THE DRAWINGS

FIG. 2 is a horizontal sectional view of a part of the transmission of FIG. 1a;

DETAILED DESCRIPTION OF THE PREFERRED EMBODIMENT

Figure 1A:
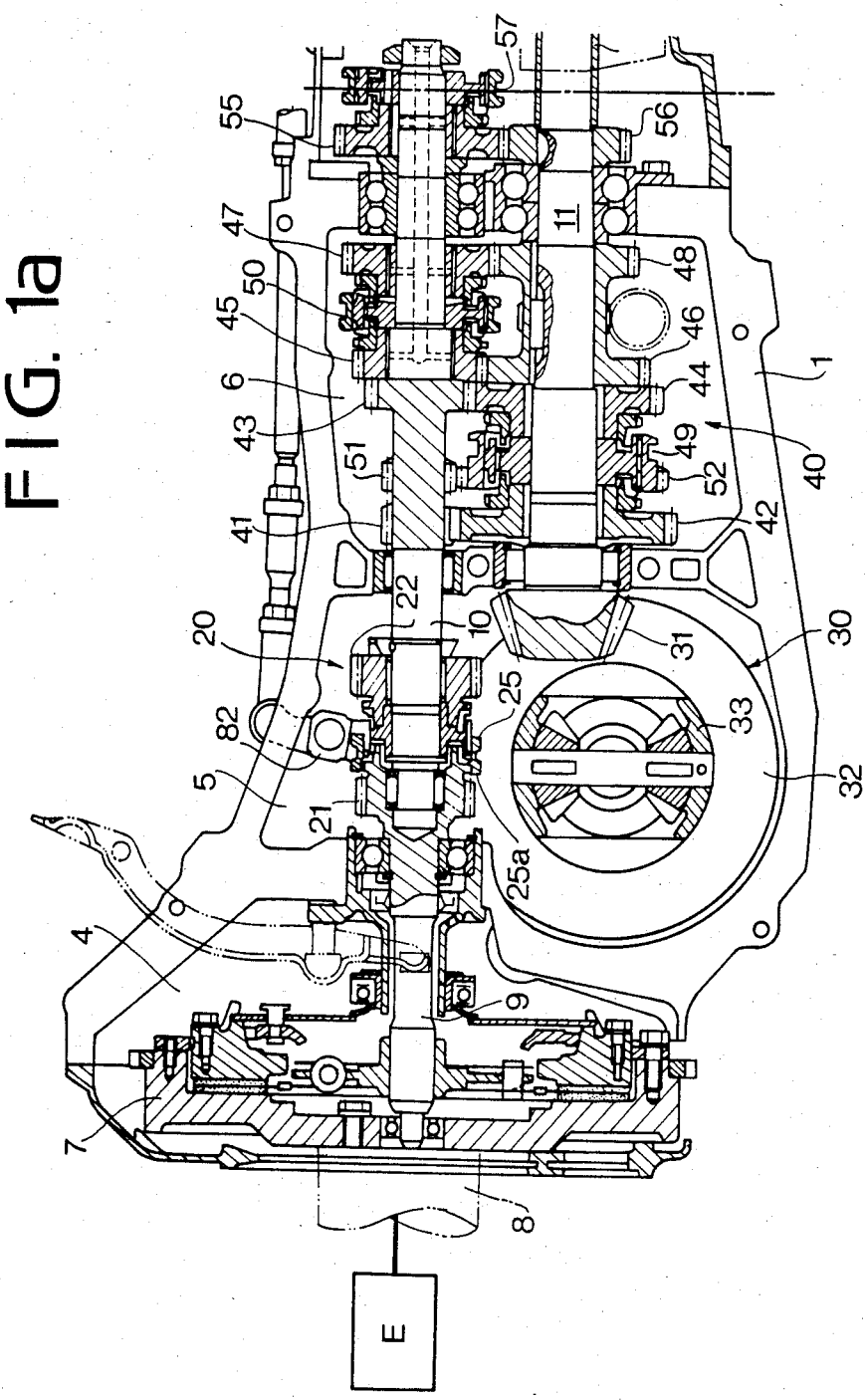
FIGS. 1a and 1b are longitudinal sectional views showing a transmission for a four-wheel drive motor vehicle, to which the present invention is applied.
Figure 1B:
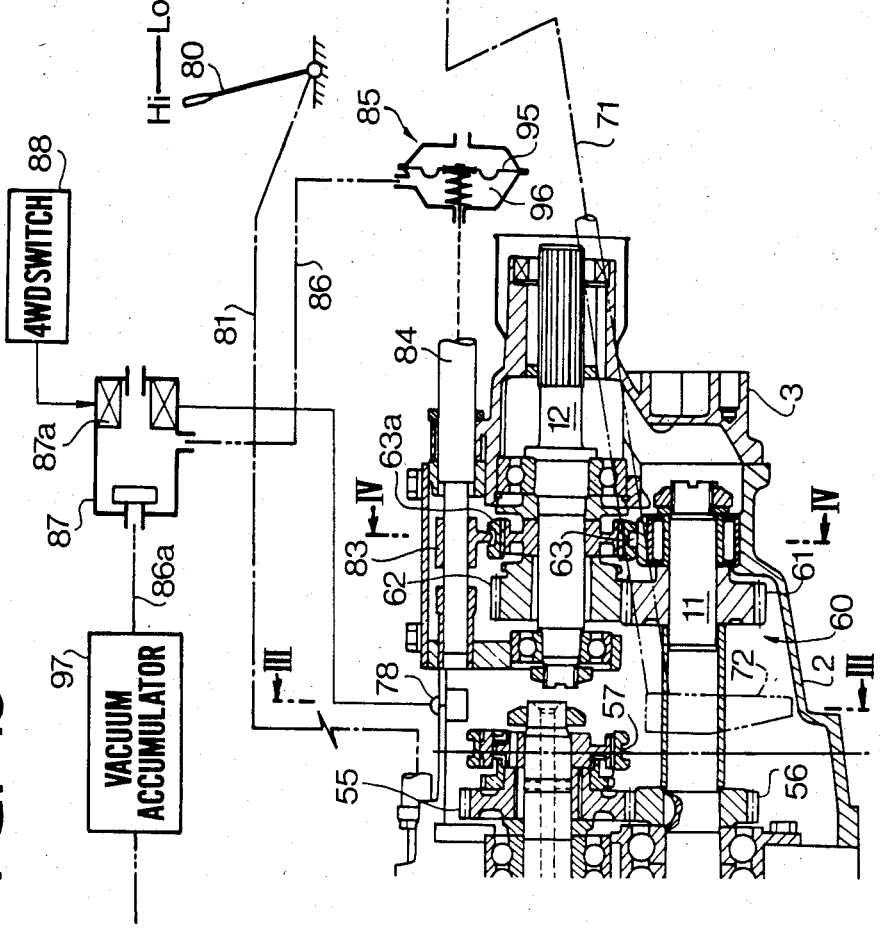
Figure 2:
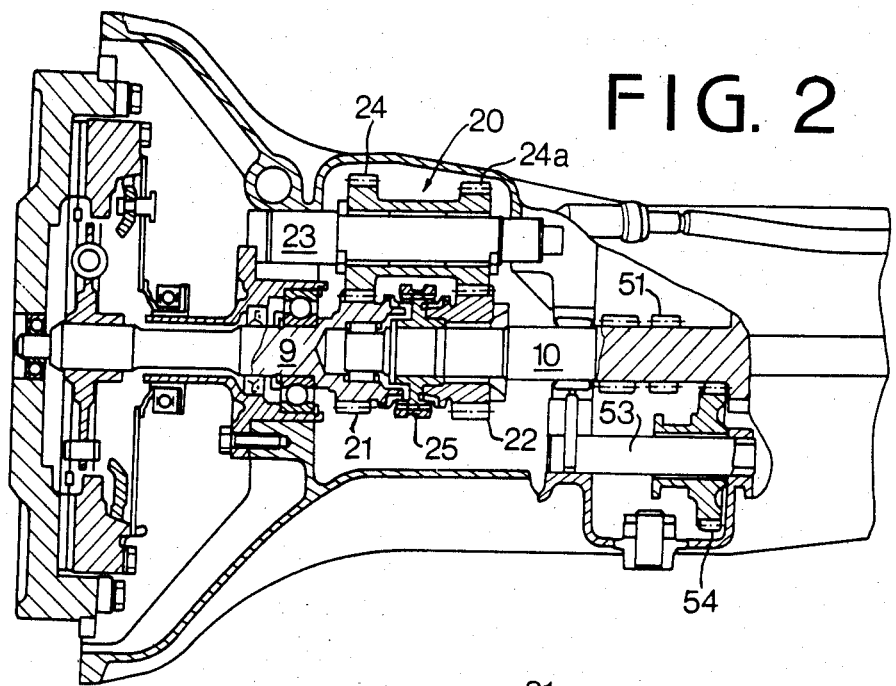

Referring now to the drawings, and more particularly to FIGS. 1a, 1b and 2, there is illustrated a longitudinally disposed trans-axle type transmission for a part-time four-wheel drive motor. The transmission comprises a transmission case 1, a transfer case 2 secured to the case 1 at the rear end thereof, and an extention case 3 secured to the case 2. The transmission case 1 comprises a pair of longitudinally divided shells and the inside thereof is divided into three compartments 4 to 6. A clutch 7 is provided in the forward compartment 4, and a sub-transmission 20 and a front differential 30 are arranged in the middle compartment 5. A main transmission 40 is provided in the rear compartment 6 and case 2, and a transfer device 60 is disposed in the case 2. In the driving system, a crank shaft 8 of an engine E is operatively connected to an end of an input shaft 9 through the clutch 7 and the sub-transmission 20 is disposed between the input shaft 9 and a main drive shaft 10 of the main transmission 40.

The sub-transmission 20 comprises a high speed gear 21 formed on the input shaft 9, a low speed gear 22 rotatably mounted on the main drive shaft 10 in alignment with the shaft 9, counter gears 24 and 24a (FIG. 2) rotatably mounted on a counter shaft 23, and engaged with both gears 21 and 22, and a synchronizer 25 as a clutch disposed between the high speed gear 21 and the low speed gear 22 on the main drive shaft 10. As shown in FIG. 2, when the synchronizer 25 is engaged with the high speed gear 21, the shaft 9 is directly coupled to the shaft 10 to provide a higher speed drive range, and, to the contrary, when the synchronizer 25 is engaged with the low speed gear 22, the gear 21 is connected to the shaft 10 through the gears 24, 24a and 22 to provide a lower speed drive range.

The main transmission 40 is a five-speed transmission with overdrive, in which an output shaft 11 is arranged below the drive shaft 10 in parallel with it. First-speed gears 41 and 42, second-speed gears 43 and 44, third-speed gears 45 and 46, and fourth-speed gears 47 and 48 are provided on both shafts 10 and 11. The first-speed and second-speed driven gears 42 and 44 are rotatably mounted on the output shaft 11 and a synchronizer 49 is disposed between the driven gears. The third-speed and fourth-speed drive gears 45 and 47 are rotatably mounted on the main drive shaft 10 and a synchronizer 50 is disposed between the drive gears. For reverse driving, an idler gear 54 is slidably mounted on a shaft 53 as shown in FIG. 2, and adapted to be engaged with a drive gear 51 on the drive shaft 10 and with a driven gear 52 on the sleeve of the synchronizer 49. In addition, the main transmission has fifth speed gears 55 and 56 between the main drive shaft 10 and the output shaft 11, and a synchronizer 57 arranged between the rotatable drive gear 55 and the shaft 10. A drive pinion 31 is formed at the front end of the shaft 11 and engaged with a crown gear 32 of the front differential 30, and a differential gear device 33 of the front differential 30 is coupled to front wheels (not shown) of the vehicle. The synchronizers 49, 50 and 57 are operated by manipulating a gearshift lever 70 through a rod 71 and a shifter arm 72 as described hereinafter.

In the transfer device 60, a transfer drive gear 61 securely mounted on the output shaft 11 is engaged with a driven gear 62 rotatably mounted on a rear drive shaft 12 and a transfer clutch 63 in the form of a synchronizer is disposed between the gear 62 and the shift 12.

Figure 5:
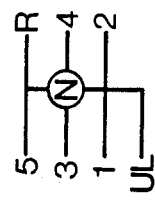
FIG. 5 shows a shift pattern of a gearshift lever.
Figure 3:
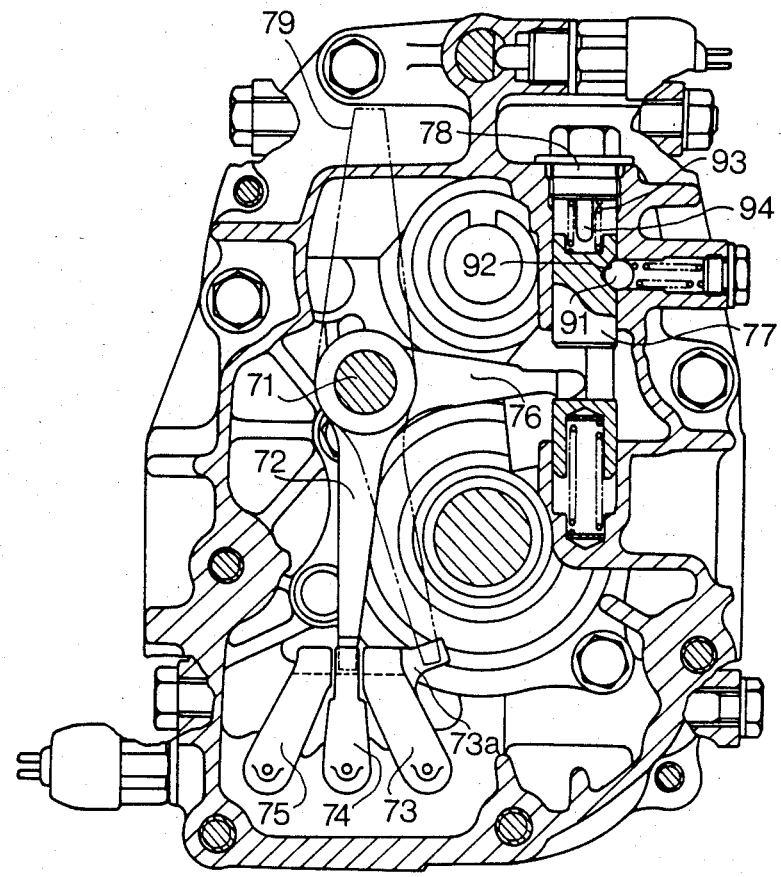
FIG. 3 is a sectional view taken along a line III—III of FIG. 1.

Explaining a selecting device for operating the synchronizers 49, 50 and 57, the clutch 25 of the sub-transmission 20 and the clutch 63 of transfer device 60, the shift pattern of the gearshift lever 70 has an UL speed postion for the ultra-low speed gear adjacent the first gear position as shown in FIG. 5. As shown in FIG. 3, the shifter rod 71 is connected to the shifter arm 72 which is selectively engaged with one of several shifter rail arms 73, 74, 75. The shifter rail arm 73 is for the first and second gears, the arm 74 is for the third and fourth gears, and the arm 75 is for the fifth and reverse gears. The arm 73 for the first and second gears has a projected engaging portion 73a which is engageable with the shifter arm 72 when the gearshift lever 70 is shifted to the UL speed position for selecting the ultra-low speed gear.

Other arms 76 and 79 are projected from the shifter rod 71. The arm 76 engages with an actuator or slide 77 and pushes it, when the arm is rotated in the counter-clockwise direction for selecting the ultra-low speed gear. The slide 77 is positioned by a spring loaded ball 91 engaging with a notch 92 thereof. An UL select switch 78 is provided adjacent the slide 77 and a spring 93 is disposed between the switch and the slide. An actuating rod 94 of the switch 78 is adapted to be operated by the slide 77.

A select lever 80 for the sub-transmission 20 has two positions of high speed range Hi and low speed range L₀. The select lever 80 is operatively connected to a sleeve 25a of the synchronizer 25 through a rod 81 and a lever 82 so as to shift the sleeve 25a to operate the synchronizer 25.

Figure 4:
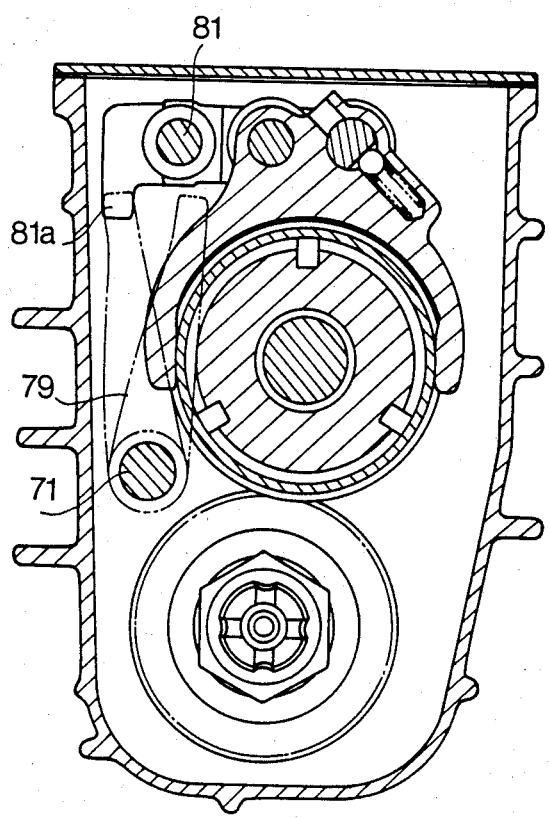
FIG. 4 is a sectional view taken along line IV—IV of FIG. 1.

The rod 81 has a projected engaging portion 81a as shown in FIG. 4. The end of the arm 79 is engageable with the engaging portion 81a, when the gearshift lever 70 is shifted to the UL speed position.

On the other hand, engaged with a sleeve 63a of the transfer clutch 63 is a fork 83 secured to a shiftable rod 84 which is connected to a diaphragm 95 of a vacuum operated actuator 85. A vacuum chamber 96 of the actuator 85 is communicated with a vacuum accumulator 97 through a solenoid operated valve 87 and passages 86 and 86a. The accumulator 97 is communicated with an intake passage of the engine to keep vacuum thereof. A solenoid 87a of the valve 87 is electrically connected to a battery through switches 78 and a manual 4WD switch 88, so that the solenoid is energized by closing of one of the switches to communicate the passage 86a with passage 86.

The operation of the apparatus will now be explained. When the 4WD switch 88 is opened, the valve 87 is closed, so that the rod 84 is at a right position to disengage the transfer clutch 63. On the other hand, the select lever 80 is at the high speed range position Hi to engage the sleeve 25a of the synchronizer 25 with the high speed gear 21. Thus, the power of the engine is transmitted to only the front wheels (not shown) of the vehicle through the high speed gear 21, the transmission 40, and the front differential 30, thereby to establish the two-wheel drive for the motor vehicle. By operating the gearshift lever 70, first speed gear to fifth speed gear in high speed range can be selected.

When the selected lever 80 is shifted to the low speed range position L₀, the rod 81 is moved to the left to swing the lever 82 in the counter-clockwise direction. Thus, the sleeve 25a of the synchronizer 25 engages with the low speed gear 22, so that two-wheel low speed drive is provided.

When the manual 4WD switch 88 is closed, the solenoid 87a is energized to communicate the passage 86a with the passage 86. Accordingly, the pressure in the vacuum chamber 96 of the actuator 85 is reduced by the vacuum of the accumulator 97, thereby shifting the rod 84 to the left. Thus, the sleeve 63a of the transfer clutch 63 is engaged with the gear 62, so that the output of the transmission is transmitted to the rear wheels (not shown) of the vehicle to provide the four-wheel drive power of the transmission system in high and low speed ranges.

When the gearshift lever 70 is shifted to the UL speed position, the arm 79 engages with the engaging portion 81a of the rod 81 and pushes it to the left in FIG. 1 to engage the sleeve 25a of 25 with gear 22. Thus, the low speed range is established. On the other hand, the arm 72 engages with the engaging portion 73a of the arm 73 and pushes the arm 73 so as to engage the synchronizer 52 with the first speed gear 42. At the same time, the arm 76 pushes the actuator 77 to actuate the rod 94 of UL select switch 78 to close it. Accordingly, the solenoid 87 is energized to operate the vacuum operated actuator 85, so that the transfer clutch 63 engages with the gear 62. Thus, the first speed gear in the low speed range in four-wheel drive, that is the ultra-low speed four-wheel drive is established.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a power transmission system for a four-wheel drive motor vehicle, having a main transmission and a sub-transmission operatively connected to an input shaft of the main transmission, the main transmission having a gearshift lever, a shifter arm operatively connected to the gearshift lever, and shifter rail arms selectively engageable with the shifter arm for selecting one of speed gears of the main transmission, the sub-transmission including reduction gear trains and a clutch operable to select the transmitting speeds for transmitting the output of an engine to the input shaft, and a transfer device for transmitting the output of the main transmission to auxiliary drive wheels of the vehicle, the transfer device including a transfer clutch, the improvement comprising:
- an ultra-low speed position provided in a shift pattern of the gearshift lever, for selecting a low speed gear by combining a first speed of the main transmission and a low speed range of the sub-transmission;
- first means responsive to the movement of the gearshift lever to the ultra-low speed position for providing the first speed of the main transmission;
- second means responsive to said movement of the gearshift lever for operating the clutch of the sub-transmission to provide the low speed range of the sub-transmission;
- third means responsive to said movement of the gearshift lever for operating the transfer clutch to engage it so as to provide four-wheel drive, whereby an ultra-low speed with four-wheel drive is established.

2. In a power transmission system for a four-wheel drive motor vehicle, having a main transmission with its output drivingly connected to main drive wheels of the vehicle and a sub-transmission operatively connected to an input shaft of the main transmission, the main transmission having a gearshift lever moveable in a shift pattern, a shifter arm operatively connected to the gearshift lever, and shifter rail arms selectively engageable with the shifter arm for selecting respective speeds of speed gears of the main transmission, the sub-transmission including reduction gear trains and a clutch operable to select transmitting speeds, including a low speed range of the sub-transmission for transmitting the output of an engine to the input shaft of the main transmission, and a transfer device including a transfer clutch for selectively transmitting the output of the main transmission to auxiliary drive wheels of the vehicle for providing four-wheel drive, the improvement comprising:
- an ultra-low speed position provided in the shift pattern of the gearshift lever for selecting a low speed gear by combining a first speed of the main transmission and the low speed range of the sub-transmission;
- first means including an engaging portion projected from the shifter rail arm for the first speed of the main transmission, the engaging portion being disposed so as to engage with the shifter arm for providing the first speed of the main transmission when the shifter arm is moved by moving the gearshift lever to the ultra-low speed position;
- second means including another arm operatively connected to the gearshift lever, and another engaging portion operatively connected to the sub-transmission for providing the low speed range of the sub-transmission by said another arm operatively engaging said another engaging portion when said gearshift lever is moved to the ultra-low speed position;
- third means including a switch disposed so as to be operated by the movement of the gearshift lever to the ultra-low speed position, a vacuum operated actuator for engaging the transfer clutch, and response means responsive to operation of the switch for operating the vacuum operated actuator, whereby an ultra-low speed with four-wheel drive is established.

3. The system as set forth in claim 2, wherein said ultra-low speed position is adjacent a position for the first speed in the shift pattern.

4. The system as set forth in claim 2, wherein said third means includes an additional arm operatively connected to said gearshift lever, a slide formed with a notch, a spring-biased ball releasably engaging in said notch so as to position said slide, and said additional arm engages said slide so as to move said slide releasing said ball from said notch such that said slide operates an actuating rod of said switch when said gearshift lever is moved to the ultra-low speed position.

5. The system as set forth in claim 4, wherein said shifter arm and said another arm are substantially 180 degrees apart and said additional arm is disposed substantially 90 degrees apart.

6. The system as set forth in claim 5, further comprising
a shifter rod operatively connected to said gearshift lever,
said shifter arm, said another arm and said additional arm radially extend from said shifter rod.

7. The system as set forth in claim 2, further comprising
a 4WD switch connected to said response means for operating said acuator to provide four-wheel drive independent of operation of said first-mentioned switch.

8. The system as set forth in claim 2, wherein said response means is a solenoid-operated valve communicating with a vacuum accumulator.

9. The system as set forth in claim 8, wherein said vacuum accumulator communicates with an intake passage of the engine to provide vacuum.

10. The system as set forth in claim 2, further comprising
another lever operatively connected to the clutch of the sub-transmission via a rod, and
said another engaging portion projects from said rod.

* * * * *